United States Patent [19]

Wank

[11] 3,947,619

[45] Mar. 30, 1976

[54] METHOD OF JOINING FABRICS

[75] Inventor: Joachim Wank, Zons, Germany

[73] Assignee: Bayer Aktiengesellschaft, Leverkusen, Germany

[22] Filed: Oct. 15, 1974

[21] Appl. No.: 514,415

[30] Foreign Application Priority Data

Oct. 17, 1973 Germany............................ 2352038

[52] U.S. Cl. ................. 428/57; 156/157; 156/304; 156/309; 156/331; 260/77.5 CH; 428/224
[51] Int. Cl.². ........................................ B65H 69/06
[58] Field of Search ........... 156/157, 159, 304, 331, 156/307, 309, 305, 308; 260/77.5 CH; 428/57, 58, 61, 224

[56] References Cited
UNITED STATES PATENTS

| | | |
|---|---|---|
| 2,495,761 | 1/1950 | Platt .................................. 156/309 |
| 2,506,915 | 5/1950 | Bishop ............................... 156/305 |
| 2,593,090 | 4/1952 | Bartosz .............................. 156/168 |
| 2,977,839 | 4/1961 | Koch .................................. 156/149 |
| 3,645,978 | 2/1972 | Craven ........................ 260/77.5 CH |

*Primary Examiner*—William A. Powell
*Assistant Examiner*—Brian J. Leitten
*Attorney, Agent, or Firm*—Connolly and Hutz

[57] ABSTRACT

A method of joining pieces of fabric wherein a high temperature-resistant shrinkable film is placed between the overlapping or on the abutting ends of fabric, after these have been impregnated with a highly volatile solvent for the film, and the ends of the fabric are joined by subsequent pressing.

14 Claims, No Drawings

METHOD OF JOINING FABRICS

This invention relates to a method of joining fabrics, the joints formed being resistant to high temperatures.

It is known that fabrics may be joined together by stitching. In numerous applications, stitching has the disadvantage that the joint is several times thicker than the fabric. When the joined fabric is rolled up, the roll show bulges which even several layers of fabric are unable to eliminate.

In another process, by which this bulging effect is eliminated, the ends of fabrics are joined together with a film by means of high-frequency welding. In this process, the film used has to have an extremely high dielectric loss factor and as low a softening point as possible so that it melts during welding. The disadvantage of this process lies in the extremely expensive welding apparatus required. Due to the low softening point of the film, the weld seam is often insufficiently temperature-resistant and intends to split during subsequent coating with plastics material.

In addition, it has been found that the lengths of fabric become narrower under the influence of heat during the coating or being rolled up under the pressure of the roll, whereas the joints retain their original width.

It has now been found that these disadvantages may be eliminated by using the inventive method.

The invention relates to a method of making a high temperature resistant shrinkable joint in a fabric which comprises impregnating the ends of a fabric with a highly volatile solvent which does not dissolve the fabric, placing a high temperature resistant shrinkable film strip, soluble in said highly volatile solvent, between the overlapping or on the abutting ends of the fabric and applying pressure to the ends of the fabric to produce a joint.

High temperature-resistant, shrinkable films with a thickness of from 20 to 100 $\mu$ thick are suitable for the inventive method. Shrinkable films of polyhhydantoins which are resistant to temperatures of up to 260°C are particularly suitable. Shrinkable films of polyhydantoins, polymers which are prepared in accordance with U.S. Pat. No. 3,397,253 are obtained from a polyhydantoin solution by casting techniques known per se and by subsequently stretching the films thus obtained monoaxially or biaxially at temperatures just below the solidification point of the polymer in a stretching ratio of from 1.1 to 3.0. These films shrink under the influence of solvents or swelling agents or at temperatures above the stretching temperature in the proportions according to the stretching ratio, provided that they are not mechanically impeded.

Readily volatile solvents for the films are for example in the case of polyhydantoin films methylene chloride.

The pressure applied to the film during the joining of the fabrics is from 5 to 55 kg/cm². Pressing is normally carried out at 25°C. However, the temperature of the pressing may also be increased up to the boiling point of the solvent, which further increases the strength of the joint, whilst the pressing time, which is normally between 1 second and 1 minute, may be reduced to periods of considerably less than 1 minute.

By virtue of the inventive method fabrics of natural and synthetic origin, for example cotton fabrics, fabrics of polyesters, polyamides, polyurethanes and glass can be joined quickly and very firmly together in a temperature-resistant manner to form endless webs of fabric without any danger for the joint of splitting in the event of any subsequent coating with plastics material. The differences in width between the length of the fabric and the joint which occurred inter alia during winding up, may also be eliminated by using shrinkable films.

EXAMPLE 1

In order to butt-join webs of a cotton fabric together, the ends of the fabrics impregnated with methylene chloride are fitted together edge-to-edge, and an approximately 2 cm wide strip of 100 $\mu$ thick shrinkable polyhydantoin film, which has been monoaxially stretched in a ratio of 1 : 1.2 is placed on the surface of the ends of the fabrics on one side. The joints are pressed for 10 seconds under a pressure of about 20 kg/cm² at a temperature of about 40°c. The strength of the joint is generally greater than the strength of the fabric. Accordingly, it is not possible to quote the strength of the joint in figures. The joint is resistant to temperatures of up to 260°c neither is affected by boiling in a 10 % sodium hydroxide solution or boiling in a hydrogen peroxide solution, nor damaged by coating the fabric with a melt of plasticised PVC at 230° – 250°C.

When the joined webs of fabric were wound into a roll and stored it was not possible to detect any differences in width between the fabric and the joint.

EXAMPLE 2

A 20 mm wide strip of 100 $\mu$ thick shrinkable polyhydantoin film (monoaxially stretched in a ratio of 1 : 1.2) is placed on both surfaces of abutting ends of a woven glass-fibre fabric, the ends of the fabric having been wetted with methylene chloride. The joint is pressed for from 5 to 10 seconds under a pressure of 20 kg/cm² at a temperature of about 40°C. The strength of the joint is generally greater than the strength of the fabric, so that it is not possible to quote any figures. The joint is resistant to temperatures of up to 260°C and is unaffected by boiling in a 10 % sodium hydroxide solution or by boiling in a hydrogen peroxide solution, nor is damaged by coating the fabric with a melt of plasticised PVC at 230° – 250°C.

When the joined webs of fabric were wound into a roll and stored it was not possible to detect any differences in width between the fabric and the joint.

EXAMPLE 3

A strip of an oriented amorphous shrinkable polyhydantoin film (stretched 1 : 1.2) with a thickness of approximately 40 $\mu$ is placed between the overlapping ends, which have been wetted with methylene chloride of a cotton fabric. The ends of the cotton fabric are pressed onto one another for about 10 seconds by pressing the joints under a pressure of approximately 20 kp/cm² at a temperature of about 40°C. The strength of the joint is greater than the strength of the fabric, even when the strengths are compared at elevated temperature. Accordingly, it is not possible to quote any figures for the strength of the joint. The joint is resistant to temperatures of up to 260°C and is unaffected by boiling in a 10 % sodium hydroxide solution, or by boiling in a hydrogen peroxide, nor is damaged by coating the fabric with a melt of plasticised PVC, at 230° – 250°C.

When the joined webs of fabric were wound into a roll and sotred it was not possible to detect any differences in width between the fabric and the joint.

EXAMPLE 4

A strip of oriented, amorphous shrinkable polyhydantoin cast film (stretched monoaxially 1 : 1.2) is placed between the overlapping ends, wetted with methylene chloride, of a woven glass-fibre fabric. The ends of the fabric are pressed onto one another for about 10 seconds at a pressure of 20 kg/cm$^2$ and a temperature of about 40°C. The strength of the joint is greater than the strength of the fabric. Accordingly, it is not possible to quote any figures for the strength of the joint. The joint is resistant to temperatures of up to 260°C. When the fabric was wound up, it was not possible to detect any differences in width.

I claim:

1. A method of making a high temperature resistant shrinkable joint in a fabric which comprises impregnating the ends of a fabric with a highly volatile solvent which does not dissolve the fabric, disposing a thin high temperature-resistant shrinkable strip of film, soluble in said highly volatile solvent, between the overlapping or on the abutting ends of the fabric and applying pressure to the ends of the fabric to produce the joint.

2. A method as claimed in claim 1, wherein the film is a polyhydantoin film of 20 to 100 μ thickness.

3. A method as claimed in claim 1, wherein the solvent is methylene chloride.

4. A method as claimed in claim 1 wherein the strip of film is a polyhydantoin.

5. A method as claimed in claim 4 wherein the solvent is methylene chloride.

6. A method as claimed in claim 1 wherein the strip of film is stretched prior to use in the method.

7. A method as claimed in claim 6 wherein the film was prestretched at a stretching ratio from about 1.1 to 3.0.

8. A method as claimed in claim 7 wherein the sheet of film was monoaxially stretched.

9. A method as claimed in claim 7 wherein the sheet of film was biaxially stretched.

10. A method as claimed in claim 1 wherein pressures of from about 5 to 55 kg/cm$^2$ are applied.

11. A method as claimed in claim 1 wherein the pressing is performed at about 25°C.

12. A length of fabric including at least one high temperature-resistant shrinkable joint prepared by the method which comprises impregnating the ends of a fabric with a highly volatile solvent which does not dissolve the fabric, disposing a thin high temperature-resistant shrinkable strip of film, soluble in said highly volatile solvent, between the overlapping or on the abutting ends of the fabric and applying pressure to the ends of the fabric to produce the joint.

13. A fabric as set forth in claim 12 wherein the strip of film is a polyhydantoin film.

14. A fabric as set forth in claim 13 wherein the solvent is methylene chloride.

* * * * *